(12) United States Patent
Deura et al.

(10) Patent No.: US 11,740,578 B2
(45) Date of Patent: Aug. 29, 2023

(54) MONITORING DEVICE, IMAGE RECORDATION MONITORING METHOD, AND PRINTER

(71) Applicant: BROTHER KOGYO KABUSHIKI KAISHA, Nagoya (JP)

(72) Inventors: Yushi Deura, Nagoya (JP); Shinya Esaki, Nagoya (JP); Shunsuke Minamikawa, Nagoya (JP); Tetsuya Okuno, Nagoya (JP); Haruka Azechi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/705,771

(22) Filed: Mar. 28, 2022

(65) Prior Publication Data
US 2022/0221816 A1 Jul. 14, 2022

Related U.S. Application Data

(63) Continuation of application No. PCT/JP2020/036236, filed on Sep. 25, 2020.

(30) Foreign Application Priority Data

Sep. 30, 2019 (JP) ................................ 2019-179917

(51) Int. Cl.
*G03G 15/00* (2006.01)
*B41J 2/00* (2006.01)
(Continued)

(52) U.S. Cl.
CPC ........... *G03G 15/556* (2013.01); *G03G 21/02* (2013.01); *G06Q 20/145* (2013.01);
(Continued)

(58) Field of Classification Search
CPC ........... G03G 15/0863; G03G 15/5091; G03G 15/5075; G03G 15/556; G03G 21/02;
(Continued)

(56) References Cited

U.S. PATENT DOCUMENTS 7,127,433 B2 * 10/2006 Baker ..................... G07F 17/26
705/400
2004/0039591 A1 2/2004 Matsugi
(Continued)

FOREIGN PATENT DOCUMENTS

JP 2002-67451 A 3/2002
JP 2002-82581 A 3/2002
(Continued)

OTHER PUBLICATIONS

International Search Report dated Oct. 20, 2020 issued in PCT/JP2020/036236.
(Continued)

*Primary Examiner* — Robert B Beatty
(74) *Attorney, Agent, or Firm* — Scully, Scott, Murphy & Presser, PC

(57) ABSTRACT

A monitoring device is configured to monitor image recordation by a recorder using a recording material supplied from a first cartridge and a second cartridge. the monitoring device includes a memory and a controller. The controller is configured to obtain number-of-sheet information indicating a number of sheets on which the image recordation has been performed, first consumption amount information indicating a consumption amount of a recording material consumed from the first cartridge, and second consumption amount information indicating a consumption amount of a recording material consumed from the second cartridge, determine ratio information indicating a ratio of the recording material consumed from the second cartridge to a total consumption
(Continued)

amount of the recording material consumed from the first and second cartridges based on the obtained first and second consumption amount information, and store the obtained number-of-sheet information and the determined ratio information in the memory.

18 Claims, 5 Drawing Sheets

(51) Int. Cl.
<br>    *G06Q 20/00*     (2012.01)
<br>    *G03G 21/02*     (2006.01)
<br>    *G06Q 20/14*     (2012.01)
<br>    *G06Q 30/0283*     (2023.01)
<br>    *B41J 2/175*     (2006.01)
<br>    *G03G 15/08*     (2006.01)
<br>    *G06K 15/00*     (2006.01)

(52) U.S. Cl.
<br>    CPC ....... *G06Q 30/0283* (2013.01); *B41J 2/17546* (2013.01); *B41J 2002/17569* (2013.01); *G03G 15/0856* (2013.01); *G06K 15/402* (2013.01)

(58) Field of Classification Search
<br>    CPC ........... G03G 21/1875; G03G 21/1889; G03G 21/1892; G03G 2215/00105; G03G 2215/0695; G03G 2215/0697; G03G 2221/1823; G06K 15/4075; B41J 2/17546; B41J 2002/17569; G06Q 20/145; G06Q 30/04; G06Q 30/0217; G06Q 30/0283; G06Q 30/0224; G06Q 30/06; G06Q 30/0645; G06Q 2220/12
<br>    USPC .................................. 399/12, 43, 79; 347/19
<br>    See application file for complete search history.

(56) References Cited

U.S. PATENT DOCUMENTS

| | | | |
|---|---|---|---|
| 2008/0107440 A1* | 5/2008 | Tsuzuki | G03G 21/02 399/79 |
| 2010/0202017 A1 | 8/2010 | Sano | |
| 2013/0016391 A1 | 1/2013 | Yeon et al. | |
| 2014/0075360 A1 | 3/2014 | Wang | |
| 2014/0129399 A1* | 5/2014 | Matsunaga | G07F 17/26 705/34 |
| 2016/0292550 A1 | 10/2016 | Kawai | |
| 2019/0079708 A1* | 3/2019 | Yamada | G06F 3/1263 |
| 2019/0137922 A1 | 5/2019 | Katsura | |
| 2019/0199870 A1* | 6/2019 | Minamikawa | B41J 2/17546 |
| 2019/0344583 A1* | 11/2019 | Bartlow | H04N 1/46 |

FOREIGN PATENT DOCUMENTS

| | | |
|---|---|---|
| JP | 2004-54910 A | 2/2004 |
| JP | 2006-343605 A | 12/2006 |
| JP | 2007-304650 A | 11/2007 |
| JP | 2008-112404 A | 5/2008 |
| JP | 2010-184371 A | 8/2010 |
| JP | 2012-166465 A | 9/2012 |
| JP | 2016-193592 A | 11/2016 |
| JP | 2017-68755 A | 4/2017 |
| JP | 2018-36822 A | 3/2018 |
| JP | 2019-86613 A | 6/2019 |
| WO | 2014/029218 A1 | 2/2014 |

OTHER PUBLICATIONS

International Preliminary Report on Patentability and Written Opinion dated Apr. 14, 2022 issued in PCT/JP2020/036236 together with English translation.

Notice of Reasons for Refusal dated Jun. 6, 2023 received from the Japanese Patent Office in related JP No. 2019-179917 together with English language translation.

* cited by examiner

MONITORING DEVICE, IMAGE RECORDATION MONITORING METHOD, AND PRINTER

CROSS REFERENCE TO RELATED APPLICATIONS

This is a Continuation of International Application No. PCT/JP2020/036236 filed on Sep. 25, 2020, which claims priority from Japanese Patent Application No. 2019-179917 filed on Sep. 30, 2019. The entire disclosures of the prior applications are incorporated herein by reference.

BACKGROUND

Aspects of the present disclosure relate to a method for monitoring the number of sheets used in image recordation using recording materials supplied from two types of cartridges. Aspects of the present disclosure also relate to an image recordation monitoring device employing the above method, and a non-transitory computer-readable recording medium for the image recordation monitoring device.

There has been known an image recording device in which a cartridge storing a consumable material such as ink or toner is mounted and used. Some image recording devices of this type transmit status information such as a remaining amount of a consumable material such as ink or toner stored in the cartridge in response to a request from a terminal device such as a personal computer.

Further, as modes in which the image recording device is used, there is a mode in which a user of the image recording device uses the image recording device by making, with a service provider, a contract defining a charge based on the number of recorded sheets per month, and a mode in which a cartridge purchased by the user is used in the image recording device without making the contract. For example, based on information stored in a cartridge memory of the cartridge mounted in the image recording device, when it is determined that a cartridge to be charged is mounted in the image recording device, user information and the number of recorded sheets are transmitted from the image recording device to a server of the service provider.

SUMMARY

For example, in an image recording device on which a plurality of cartridges respectively storing recording materials of single colors having different hues may be mounted and which may record a color image, there may be a situation where both a cartridge to be charged and a cartridge not to be charged are mounted in the image recording device. The cartridge not to be charged is, for example, a cartridge purchased by the user. When the number of recorded sheets is counted in the situation, recording performed using a recording material stored in the cartridge purchased by the user (the cartridge not to be charged) is also charged. Therefore, the user may need to pay for the cartridge the user purchased by himself/herself and the charge based on the number of recorded sheets.

According to aspects of the present disclosure, there is provided a monitoring device configured to monitor image recordation by a recorder configured to perform image recordation on a sheet using a recording material supplied from a first cartridge and a second cartridge mounted to a cartridge mount. the monitoring device includes a memory and a controller. The controller is configured to obtain number-of-sheet information indicating a number of sheets on which the image recordation has been performed, first consumption amount information indicating a consumption amount of a recording material consumed from the first cartridge in the image recordation, and second consumption amount information indicating a consumption amount of a recording material consumed from the second cartridge in the image recordation, determine ratio information indicating a ratio of the recording material consumed from the second cartridge to a total consumption amount of the recording material consumed from the first cartridge and the recording material consumed from the second cartridge based on the obtained first consumption amount information and second consumption amount information, and store the obtained number-of-sheet information and the determined ratio information in the memory.

According to aspects of the present disclosure, there is further provided an image recordation monitoring method including obtaining number-of-sheet information indicating a number of sheets on which image recordation has been performed by a recorder using a recording material supplied from at least one of a first cartridge and a second cartridge mounted to a cartridge mount, first consumption amount information indicating a consumption amount of the recording material consumed from the first cartridge in the image recordation, and second consumption amount information indicating a consumption amount of the recording material consumed from the second cartridge in the image recordation, and determining, based on the obtained first consumption amount information and the obtained second consumption amount information, ratio information indicating a ratio of the recording material consumed from the second cartridge to a total consumption amount of the recording material consumed from the first cartridge and the recording material consumed from the second cartridge.

According to aspects of the present disclosure, there is further provided a printer including a cartridge mount for mounting a first cartridge and a second cartridge, a recorder configured to record an image on a sheet using a first recording material supplied from the first cartridge and a second recording material supplied from the second cartridge, a memory, and a controller. The controller is configured to obtain number-of-sheet information indicating a number of sheets on which an image is recorded in a particular term, obtain first consumption amount information indicating a first consumption amount of the first recording material consumed from the first cartridge in the particular term, obtain second consumption amount information indicating a second consumption amount of the second recording material consumed from the second cartridge in the particular term, determine ratio information indicating a ratio of the second consumption amount to a total consumption amount of the first consumption amount and the second consumption amount, and determine ratio-based number-of-sheet information based on the number-of-sheet information and the ratio information, the ratio-based number-of-sheet information indicating a number of sheets on which an image is recorded using the second recording material in the particular term.

DETAILED DESCRIPTION

Hereinafter, an embodiment according to aspects of the present disclosure will be described. It is noted that the embodiment described below is merely an example of aspects of the present disclosure and thus can be modified appropriately without changing the scope of the present disclosure. For example, orders of processes described below can be modified appropriately without changing the scope of the present disclosure. Also, some of the processes described below may be omitted as appropriate without changing the scope of the present disclosure. It is also noted that aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
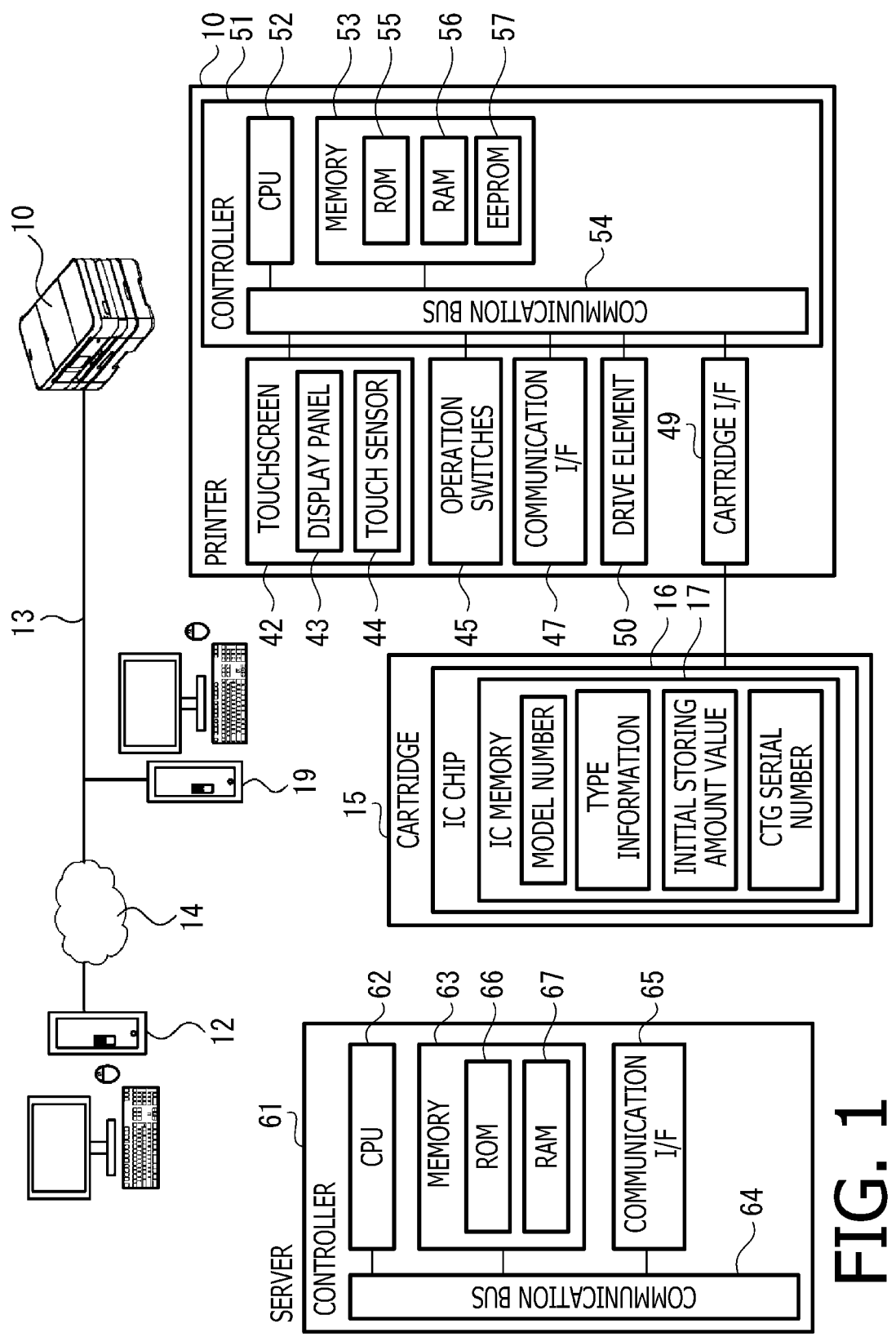
FIG. 1 is a functional block diagram of a printer.

In the present embodiment, as illustrated in FIG. 1, a printer 10 used with a connection to a local network 13 such as a LAN or a WAN will be described. The printer 10 receives a recording instruction from a terminal device 19 connected to the local network 13 and records image data included in the recording instruction on a sheet. The terminal device 19 is a personal computer, a tablet, a portable terminal, or the like. When the terminal device 19 is a tablet or a portable terminal, the terminal device 19 transmits the recording instruction to the printer 10 through an access point provided in the local network 13. The terminal device 19 is a device used by a user of the printer 10.

The user of the printer 10 makes a contract with the service provider to use the printer 10, or uses the printer 10 without making a contract with the service provider. The service provider is a person who provides the user with a service for supplying cartridges 15 to be used in the printer 10. The service provider provides a service to the user of the printer 10 using a server 12 connected to the Internet 14. The server 12 receives sheet count information, consumption amount information, a CTG serial number and the like transmitted by the printer 10 through the Internet 14.

The local network 13 to which the printer 10 is connected is connected to the Internet 14 via a gateway device such as a router. The printer 10 communicates with the server 12 via the local network 13 and the Internet 14 using a communication protocol such as HTTP or HTTPs. Specifically, the printer 10 transmits an HTTP request to a URL disclosed by the server 12. The server 12 receives the HTTP request transmitted by the printer 10, and transmits a response to the received HTTP request to the printer 10 via the Internet 14.

As illustrated in FIG. 1, the server 12 includes a controller 61. The controller 61 includes a CPU 62, a memory 63, a communication bus 64, and a communication interface (I/F) 65. The CPU 62, the memory 63, and the communication I/F 65 are connected to a communication bus 64.

The memory 63 includes a ROM 66 and a RAM 67. The ROM 66 stores an OS and an application program. Instructions described in the OS and the application program are executed by the CPU 62. The OS and the application program executed by the CPU 62 transmit and receive information and data through the communication I/F 65, and store the received information and data in the memory 63. The RAM 67 is used to execute the OS and the application program, and when the OS and the application program are executed, information and data are temporarily stored in the RAM 67.

Figure 2:
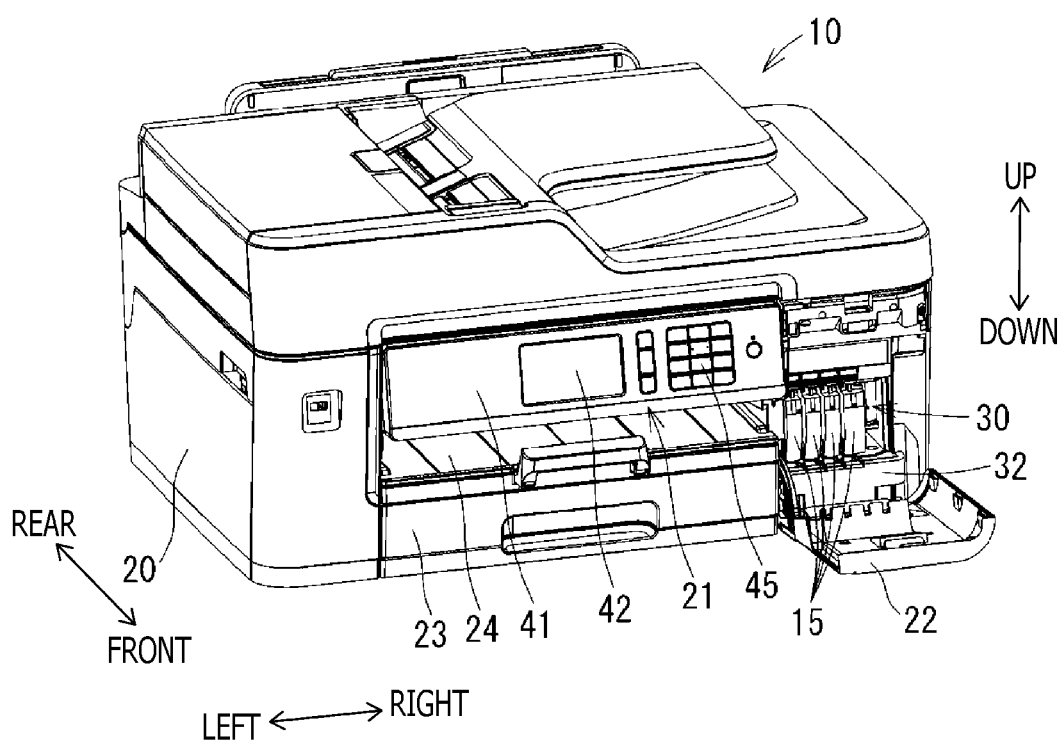
FIG. 2 is a perspective view of the printer with a cover opened.

As illustrated in FIG. 2, the printer 10 includes a housing 20, and a panel unit 21, a cover 22, a sheet feed tray 23 and a sheet discharge tray 24 held by the housing 20.

The panel unit 21 includes a panel body 41, a touchscreen 42 held by the panel body 41, and a plurality of operation switches 45. The panel body 41 has a rectangular plate shape and is attached to one surface of the housing 20. As illustrated in FIG. 1, the touchscreen 42 includes a display panel 43 configured to display an image, and a transparent film-shaped touch sensor 44 that is superimposed on the display panel 43. The touch sensor 44 outputs position information indicating a position on the display panel 43 touched by the user.

The display panel 43 and the touch sensor 44 of the touchscreen 42, and the operation switches 45 are connected to a controller 51 described later by cables or the like. The controller 51 outputs image data to the display panel 43 to cause the display panel 43 to display an image. The controller 51 receives the position information output from the touch sensor 44. The controller 51 determines an object such as an icon displayed at a position indicated by the position information input from the touch sensor 44 as the object selected by the user. The controller 51 receives an operation signal output from the operation switch 45.

As shown in FIG. 2, the sheet feed tray 23 is disposed at a lower portion of the housing 20 and is detachably held by the housing 20. The sheet discharge tray 24 is disposed at a lower portion of the housing 20 and above the sheet feed tray 23, and is held by the sheet feed tray 23 or the housing 20. The cover 22 is disposed on the front surface of the housing 20 and is swingably held by the housing 20. The cover 22 swings between a closed position (not shown) at which the cover 22 closes an opening 30 provided on the front surface of the housing 20 and an open position (FIG. 2) at which the cover 22 opens the opening 30. A mounting case 32 is disposed behind the opening 30 and held by the housing 20. The mounting case 32 is configured to detachably hold the cartridges 15. Since this configuration is well known, detailed description thereof is herein omitted.

The mounting case 32 detachably holds the plurality of cartridges 15. In the illustrated example, the mounting case 32 detachably holds four cartridges 15. Each of the four cartridges 15 stores recording material, for example, ink of one of magenta, cyan, yellow, and black colors. That is, the printer 10 is a so-called inkjet printer and is a so-called color printer. The mounting case 32 may detachably hold one or more cartridges 15 each containing toner instead of ink. That is, the printer 10 may be a so-called laser printer.

Figure 3:
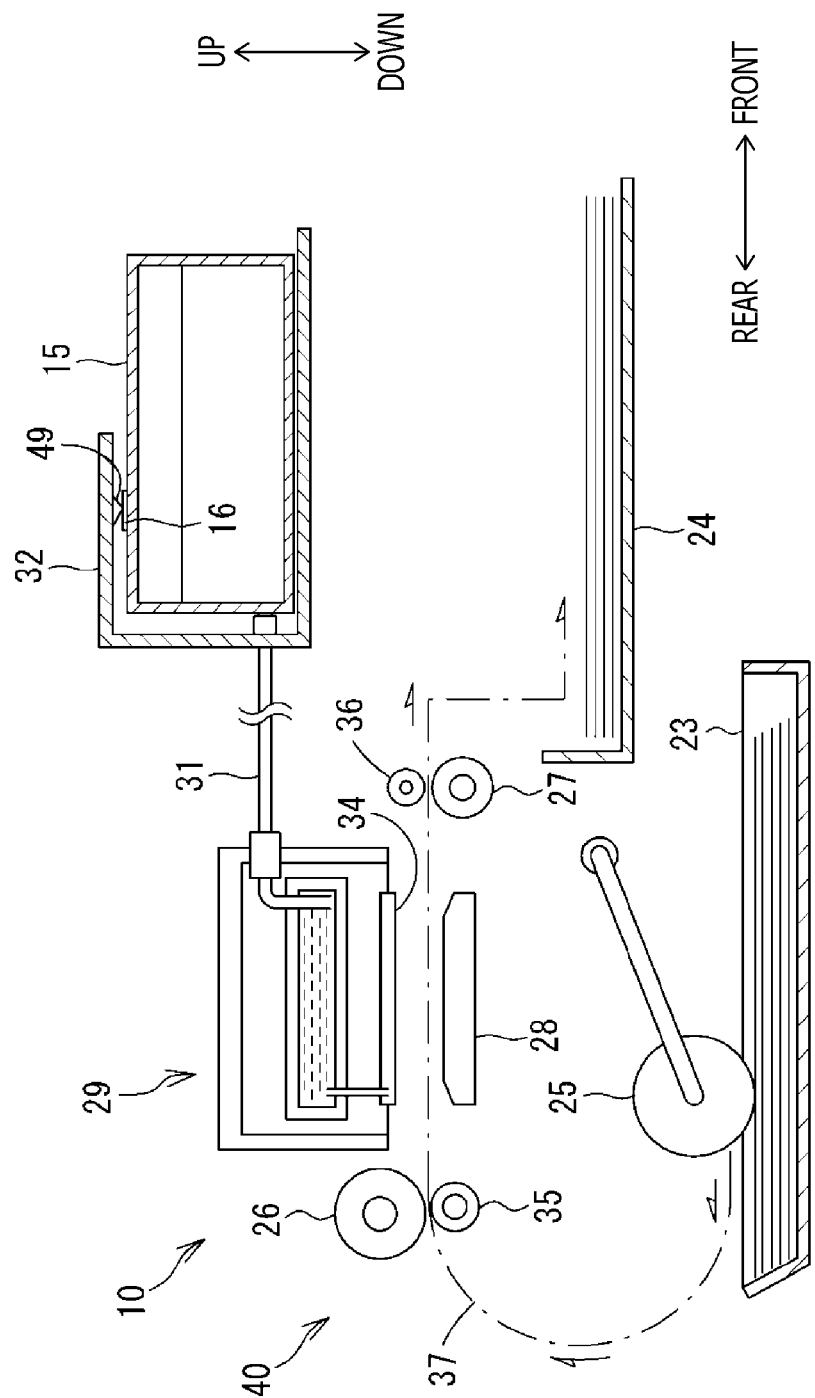
FIG. 3 is a schematic cross-sectional view of the printer.

As shown in FIG. 3, the mounting case 32 includes a cartridge I/F 49. The cartridge I/F 49 includes terminals each corresponding to one of the cartridges 15. The cartridge I/F 49 is disposed at a position where the terminals contact electrodes of IC chips 16 of respective cartridges 15 mounted in the mounting case 32. The cartridge I/F 49 is connected to the controller 51 described later by a cable. It is noted that the cartridge I/F 49 may be an antenna, or a light emitting diode and a photodiode. That is, the cartridge I/F 49 and the IC-chip 16 may transmit and receive information through radio waves or light.

The cartridge 15 has a box shape having an internal space for storing ink. Since the basic configuration of the cartridge 15 is well known, detailed description thereof is herein omitted. The cartridge 15 includes the IC chip 16. The IC chip 16 has an electrode that contacts the terminals of the cartridge I/F 49, and an IC memory 17 (FIG. 1) electrically connected to the electrode. Alternatively, the IC chip 16 has an antenna, or a light emitting diode and a photodiode in place of the electrode. The IC memory 17 stores various information. Specifically, as illustrated in FIG. 1, the IC memory 17 stores a model number, type information, an initial storing amount value, and a cartridge (CTG) serial number.

The model number is identification information assigned to the cartridge 15 in accordance with the color of ink stored in the cartridge 15 and the type of ink such as dye or pigment. The type information is information indicating whether the cartridge 15 is a cartridge for a contract usage mode or a cartridge for a normal usage mode. The contract usage mode is a mode in which the user uses the printer 10 while making a contract with the service provider, and the normal usage mode is a mode in which the user uses the printer 10 without making a contract with the service provider. The type information may be 1-bit data that is stored at a predetermined address of the IC memory 17 and that indicates "0" or "1." "1" may indicate that the cartridge is for the contract usage mode. "0" may indicate that the cartridge is for the normal usage mode. However, the type information may be included in the model number. That is, one model number may indicate the color and type of one ink and that the cartridge 15 is for the normal usage mode or the contract usage mode. The cartridge for the contract usage mode is a first cartridge supplied by a service provider. The cartridge for the normal usage mode is a second cartridge included in a new printer 10. The controller 51 of the printer 10 determines that the cartridge 15 for the normal usage mode or the contract usage mode is mounted to the mounting case 32 in response to reading the type information from the IC memory 17 of the cartridge 15 mounted to the mounting case 32 through the cartridge I/F 49.

The initial storing amount value indicates an initial amount of ink stored in the cartridge 15. The initial storing amount value is used for calculation of a remaining amount of ink in the cartridge 15 and the like by the controller 51. The CTG serial number is a number for identifying the cartridge 15.

As illustrated in FIG. 3, the housing 20 holds a recording engine 40 therein. The recording engine 40 mainly includes a sheet feed roller 25, a conveying roller 26, a discharge roller 27, a platen 28, and a recorder 29. The sheet feed roller 25 is held by a frame provided in the housing 20 so as to contact a sheet placed on the sheet feed tray 23. The sheet feed roller 25 is rotated by a motor. The rotating sheet feed roller 25 feeds the sheet to a conveyance path 37. The conveyance path 37 is a space defined by a guide member. In the illustrated example, the conveyance path 37 extends in a curved manner from a rear end of the sheet feed tray 23 to a position above the sheet feed tray 23, and then extends forward.

The conveying roller 26 is located downstream of the sheet feed tray 23 in a conveying direction of the sheet. The conveying roller 26 and a driven roller 35 constitute a roller pair. The conveying roller 26 is rotated by a motor. The rotating conveying roller 26 and driven roller 35 convey the sheet fed to the conveyance path 37 by the sheet feed roller 25 while nipping the sheet. The discharge roller 27 is located downstream of the conveying roller 26 in the conveying direction of the sheet. The discharge roller 27 and a driven roller 36 constitute a roller pair. The discharge roller 27 is rotated by a motor. The rotating discharge roller 27 and driven roller 36 convey the sheet while nipping the sheet, and discharge the sheet on the sheet discharge tray 24. The platen 28 is located downstream of the conveying roller 26 and upstream of the discharge roller 27 in the conveying direction of the sheet.

The recorder 29 is located above the platen 28. The recorder 29 may be movably held by a guide rail that is a part of the frame, or may be fixed to the frame. That is, the printer may be a so-called serial printer or a so-called line printer. The recorder 29 has a head 34. The head 34 has channels therein through which ink flows. The channels communicate with the internal space of the cartridge 15 mounted in the mounting case 32 via a tube 31. That is, the ink stored in the cartridge 15 is supplied to the head 34 through the tube 31.

As illustrated in FIG. 1, the head 34 has a drive element 50. A portion of the drive element 50 constitutes a channel inside the head 34. The drive element 50 is electrically connected to the controller 51 by a cable or the like. The drive element 50 is a piezoelectric element or a heater. The drive element 50 of a piezoelectric element deforms by being supplied with a direct current voltage, applies pressure to ink in the channel, and causes ink droplets to be ejected from a nozzle that is an opening of the channel. The drive element 50 of a heater generates heat by being supplied with a direct current voltage, causes ink in the channel to bump, and causes ink droplets to be ejected from the nozzle.

As illustrated in FIG. 1, the printer 10 includes the controller 51. The controller 51 includes a CPU 52, memory 53, and a communication bus 54. The CPU 52, the memory 53, the touchscreen 42, the operation switches 45, a communication I/F 47, the drive element 50, and the cartridge I/F 49 are connected to the communication bus 54. That is, the CPU 52 is connected to the memory 53, the touchscreen 42, the operation switches 45, the communication I/F 47, the drive element 50, and the cartridge I/F 49 via the communication bus 54 so as to exchange information and data with each other.

The memory 53 includes a ROM 55, a RAM 56, and an EEPROM 57. The ROM 55 stores an OS and a control program in advance. Instructions described in the OS and the control program are executed by the CPU 52. That is, the OS and the control program are executed by the CPU 52. The OS and the control program executed by the CPU 52 causes the display panel 43 to display an image and receives an input from the user through the touch sensor 44 and/or the operation switches 45. The OS and the control program executed by the CPU 52 transmit and receive information and data through the communication I/F 47 and the cartridge I/F 49, and stores the received information and data in the memory 53. The OS and the control program executed by the CPU 52 output drive signals to the drive element 50 to record an image on a sheet.

The RAM 56 is used for execution of the OS and control program, and temporarily stores information and data in the execution of the OS and control program. The EEPROM 57 stores printer information including a main body serial number and a model name, sheet count information, consumption amount information, and the like. When the printer 10 is used in the contract usage mode, the EEPROM 57 stores the URL disclosed by the server 12.

The "printer information" is a management information base (MIB) stored in the memory 53, and indicates information including the model name, the main body serial number, and the like. That is, the "printer information" is information stored in advance in the memory 53. The "printer information" may include information stored in the EEPROM 57 of the memory 53 after the printer 10 is installed, such as a private IP address assigned to the printer 10 by the gateway device in the local network 13.

The "sheet count information" is information indicating the number of sheets recorded by the recording engine 40, and is information counted by the controller 51 and stored in the EEPROM 57 of the memory 53. The controller 51 counts the number of sheets on which images have been recorded by the recording engine 40, and stores the counted number of sheets as sheet count information in the EEPROM 57 of the memory 53.

The "consumption amount information" is information indicating a consumption amount of recording material, e.g., an amount of ink, consumed by the recording engine 40, and is information counted by the controller 51 and stored in the EEPROM 57 of the memory 53. The controller 51 counts the number of times the drive element 50 is driven as a dot count value. The controller 51 calculates a cumulative value of the dot count value, for each cartridge 15, and stores, as consumption amount information, the cumulative value for each cartridge 15 in the EEPROM 57 of the memory 53 in association with the CTG serial number read from the memory 17 of each cartridge 15 through the cartridge I/F 49. The controller 51 calculates a remaining amount of ink stored in each cartridge 15 mounted in the mounting case 32 by subtracting the cumulative value from the initial storing amount value read from the IC memory 17 through the cartridge I/F 49.

Recording Process

Figure 4:
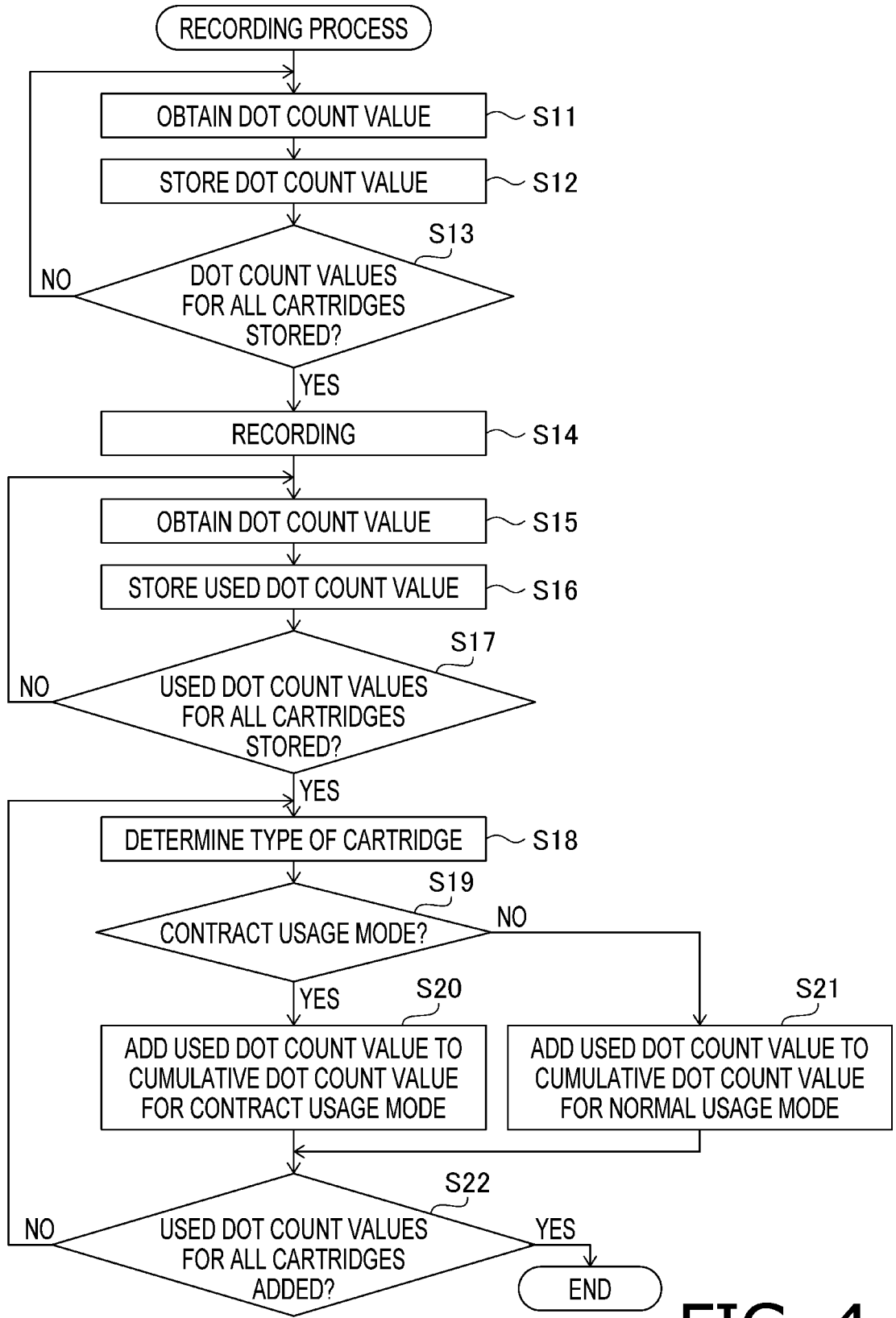
FIG. 4 is a flowchart of a recording process.

A recording process by the printer 10 will be described. The printer 10 receives a recording instruction from the terminal device 19 connected to the local network 13, and starts the recording process illustrated in FIG. 4 for recording image data included in the recording instruction on a sheet. In the present embodiment, it is assumed that both the cartridge for the contract usage mode and the cartridge for the normal usage mode are mounted in the mounting case 32 of the printer 10. Specifically, it is assumed that three cartridges 15 respectively storing first recording material, e.g., cyan, magenta, and yellow inks and for the contract usage mode, and one cartridge 15 storing second recording material, e.g., black ink and for the normal usage mode are mounted in the mounting case 32. The controller 51 stores, in the EEPROM 57 of the memory 53, information indicating that at least one cartridge 15 for the contract usage mode is mounted in response to at least one cartridge 15 for the contract usage mode is mounted in the mounting case 32.

The controller 51 of the printer 10 that has started the recording process obtains the cumulative value of the dot count value for each cartridge 15 mounted in the mounting case 32 (S11). The cumulative value of the dot count value for each cartridge 15 is stored in the EEPROM 57 of the memory 53 in association with the CTG serial number as consumption amount information. The controller 51 stores each cumulative value of the dot count value stored in the EEPROM 57 in the RAM 56 of the memory 53 (S12).

The controller 51 stores the cumulative values of the dot count values for the four cartridges 15 in the RAM 56 (S13: Yes), and then executes recording based on the image data included in the recording instruction (S14). When a color image is recorded, each ink stored in each cartridge 15 is ejected from the head 34 of the recorder 29. The controller 51 counts the number of times of driving the drive element 50 of the head 34 as a dot count value, calculates an accumulated value of each dot count value in association with the CTG serial number of each cartridge 15, and stores the accumulated value in the EEPROM 57 of the memory 53.

When the recording is completed, the controller 51 obtains the cumulative value of the dot count value for each cartridge 15 from the EEPROM 57 (S15). Then, the controller 15 subtracts the cumulative value of the dot count value for each cartridge 15 before recording stored in the RAM 56 from the obtained cumulative value of the dot count value for each cartridge 15 to determine a used dot count value corresponding to the amount of ink used in the recording, and stores the used dot count value in the RAM 56 (S16). When the recording is completed, the controller 51 adds the number of sheets to the sheet count information stored in the EEPROM 57 of the memory 53.

After storing the used dot count values for all the cartridges 15 in the RAM 56 (S17: Yes), the controller 51 determines the type of each cartridge 15 mounted in the mounting case 32 (S18). The controller 51 reads the type information from the IC memory 17 of each cartridge 15 mounted in the mounting case 32, and determines whether each cartridge 15 is for the contract usage mode or the normal usage mode (S19).

In response to determining that the cartridge 15 is for the contract usage mode (S19: Yes), the controller 51 adds the used dot count value of the cartridge 15 for the contract usage mode to a cumulative dot count value for the contract usage mode, and stores the result in the EEPROM 57 of the memory 53 (S20). In the present embodiment, the used dot count values of the three cartridges 15 respectively storing cyan, magenta, and yellow are added to the cumulative dot count value for the contract usage mode.

In response to determining that the cartridge 15 is for the normal usage mode (S19: No), the controller 51 adds the used dot count value of the cartridge 15 for the normal usage mode to a cumulative dot count value for the normal usage mode, and stores the result in the EEPROM 57 of the memory 53 (S21). In the present embodiment, the used dot count value for the cartridge 15 storing black ink is added to the cumulative dot count value for the normal usage mode. When the addition of the used dot count values for all the cartridges 15 is completed (S22: Yes), the controller 51 ends the recording process.

Transmission of Information to Server 12

Figure 5:
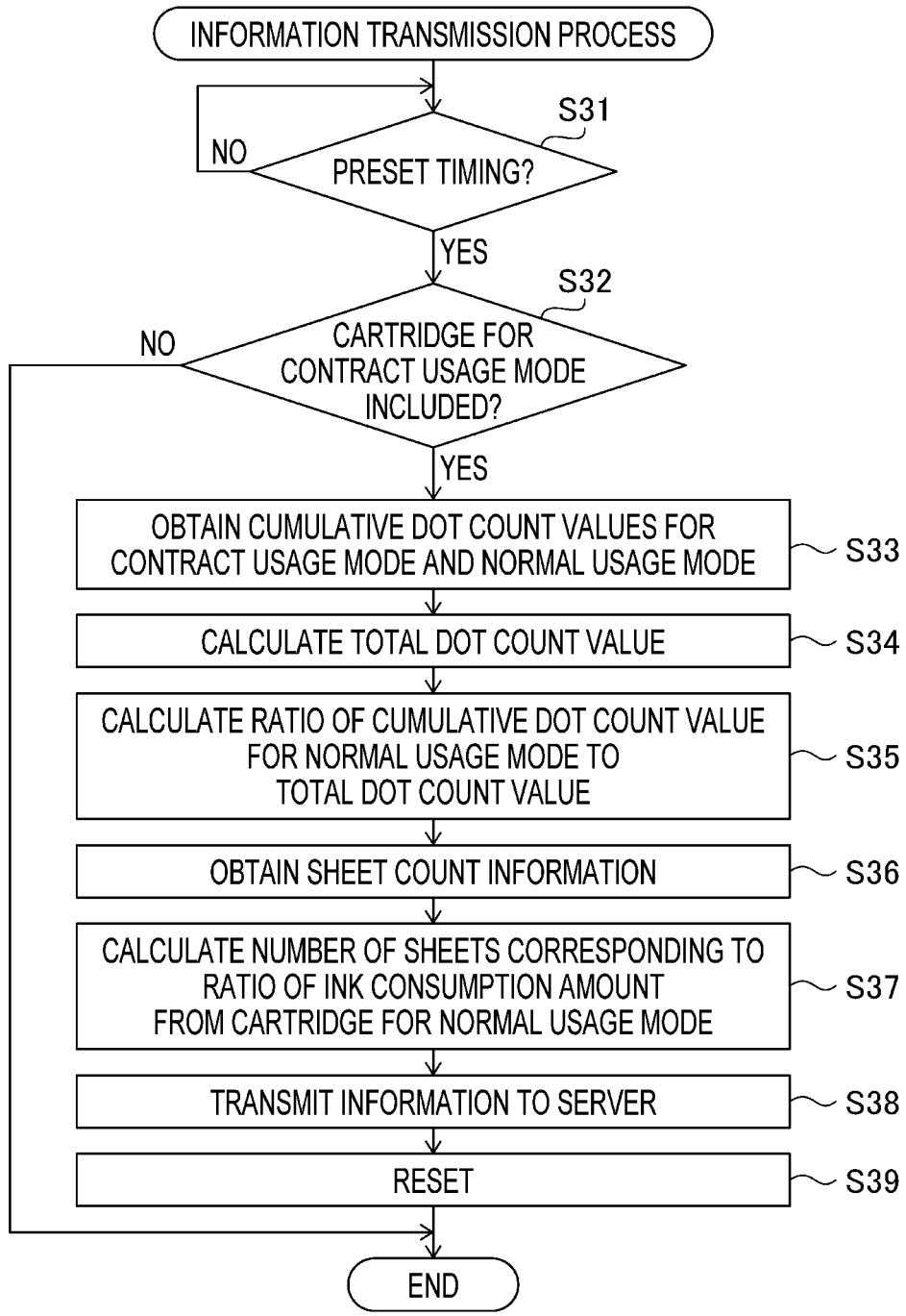
FIG. 5 is a flowchart of an information transmission process.

Hereinafter, information transmission process for transmitting information from the printer 10 to the server 12 will be described. As illustrated in FIG. 5, the controller 51 of the printer 10 determines whether the current timing is a preset timing (S31). The controller 51 obtains the current date and time from an internal clock or external information, and compares the obtained current date and time with the preset timing stored in the EEPROM 57 of the memory 53. Then, in response to the current timing being the preset timing (S31: Yes), for example, in response to the current timing being the first day of each month, the controller 51 determines whether the information indicating that at least one cartridge 15 for the contract usage mode is mounted is stored in the EEPROM 57 of the memory 53 (S32). When the information indicating that at least one cartridge 15 for the contract usage mode is mounted is not stored in the EEPROM 57 of the memory 53 (S32: No), that is, when only the cartridges 15 for the normal usage mode are mounted, the controller 51 ends the process without transmitting information to the server 12.

When the information indicating that at least one cartridge 15 for the contract usage mode is mounted is stored in the EEPROM 57 of the memory 53 (S32: Yes), the controller 51 obtains a first consumption amount, e.g., the cumulative dot count value for the contract usage mode, and a second consumption amount, e.g., the cumulative dot count value for the normal usage mode, stored in the EEPROM 57 of the memory 53 (S33). Then, the controller 51 calculates a total dot count value by adding the obtained cumulative dot count value for the contract usage mode and the cumulative dot count value for the normal usage mode (S34).

Then, the controller 51 calculates a ratio (e.g., percentage) of the cumulative dot count value for the normal usage mode to the calculated total dot count value as ratio information, and stores the ratio information in the RAM 56 of the memory 53 (S35). The total dot count value corresponds to the total amount of ink used in a particular term, e.g., one month. The cumulative dot count value for the normal usage mode corresponds to the total amount of ink used in the particular term, e.g., one month from one or more cartridges 15 for the normal usage mode. The controller 51 further obtains the sheet count information stored in the EEPROM 57 of the memory 53 (S36). The sheet count information stored in the EEPROM 57 is the number of sheets recorded in the particular term, e.g., one month. Then, the controller 51 multiplies the number of sheets indicated by the sheet count information by the ratio indicated by the ratio information to calculate the number of sheets corresponding to the ratio of the ink consumption amount from one or more cartridges 15 for the normal usage mode to the total ink consumption amount in the particular term, e.g., one month, and stores the calculated number of sheets in the RAM 57 as ratio-based number-of-sheet information (S37).

Then, the controller 51 transmits the printer information, the sheet count information, and the ratio-based number-of-sheet information to the server 12 through the local network 13 and the Internet 14 (S38). It is note that the controller 51 may transmit, to the server 12, the consumption amount information and other information related to the state of the printer 10 together with the printer information, the sheet count information, and the ratio-based number-of-sheet information. Then, the controller 51 resets the sheet count information, the ratio-based number-of-sheet information, and each cumulative dot count value stored in the EEPROM 57 of the memory 53 (S39), and ends the information transmission process.

The server 12 which received the printer information, the sheet count information, and the ratio-based number-of-sheet information from the printer 10 calculates, for each printer specified by the printer information, a charge based on the number of sheets recorded from the previous reset up to the current timing (e.g., the number of sheets recorded in the particular term, e.g., one month) based on the sheet count information, and stores the charge in the memory 63. It is assumed that, in the contract between the user and the service provider, a charge system for determining a charge is defined to indicate that a particular number of sheets recorded in one month belongs to one of preset ranges of the number of sheets. Examples of the preset ranges of the number of sheets are less than 100 sheets, 100 to 500 sheets, 501 to 1000 sheets, and every 1000 sheets from 1001 sheets. The server 12 adds, for each printer, the number of sheets calculated based on the ratio-based number-of-sheet information to each preset range of the number of sheets and stores the result in the memory 63 when calculating the charge for the next month. When the number of sheets calculated based on the ratio-based number-of-sheet information is 200 sheets, the charge for the next month is calculated based on ranges of less than 300 sheets, 300 to 700 sheets, 701 to 1200 sheets, and every 1000 sheets from 1201 sheets.

Effects of Embodiment

According to the above-described embodiment, the ratio of the amount of ink consumed from one or more cartridges 15 for the normal usage mode to the total amount of ink consumed from all the cartridges 15 with respect to the number of sheets in a state in which one or more cartridges 15 for the contract usage mode and one or more cartridges 15 for the normal usage mode are mounted in the mounting case 32 is obtained. By this configuration, the server 12 monitors the number of sheets equivalent to the ink consumed from one or more cartridges 15 for the normal usage mode. Therefore, a charge based on the amount of ink consumed from one or more cartridges 15 for the normal usage mode can be deducted.

Modifications

In the above-described embodiment, the controller 51 of the printer 10 calculates the ratio-based number-of-sheet information to be transmitted to the server 12. In other words, the printer 10 functions as a monitoring device configured to monitor image recordation by the recorder 29 using ink supplied from the cartridge 15 for the contract usage mode and the cartridge 15 for the normal usage mode. However, instead of the controller 51, the controller 61 of the server 12 may calculate the ratio-based number-of-sheet information. In this case, every time recording is executed, the controller 51 of the printer 10 transmits the cumulative dot count value for each cartridge 15 to the server 12 together with the printer information. The controller 61 of the server 12 that has received the cumulative dot count value for each cartridge 15 calculates the used dot count value for each cartridge, calculates the cumulative dot count value for the contract usage mode and the cumulative dot count value for the normal usage mode, and calculates the ratio-based number-of-sheet information at the preset timing. That is, the controller 61 of the server 12 executes processes similar to steps S15 to S22 illustrated in FIG. 4 and processes similar to steps S31 to S39 illustrated in FIG. 5. In other words, the server 12 may function as the monitoring device.

Alternatively, a system including the printer 10 and the server 12 of the above-described embodiment may function as the monitoring device. For example, every time recording is executed, the controller 51 of the printer 10 calculates the cumulative dot count value for one or more cartridges 15 for the contract usage mode and the cumulative dot count value for one or more cartridge 15 for the normal usage mode, and stores the results in the memory 53. When the current timing is the preset timing (e.g., the first day of each month), the controller 51 transmits the cumulative dot count value for one or more cartridges 15 for the contract usage mode and the cumulative dot count value for one or more cartridges 15 for the normal usage mode stored in the memory 53 to the server 12. Then, the controller 61 of the server 12 may execute steps S34 to S37 illustrated in FIG. 5. In this case, the process of step S38 is not needed.

Further, the controller 61 of the server 12 may calculate the cumulative dot count value. In this case, the controller 51 of the printer 10 executes the processes of steps S11 to S17 in each recording, and the controller 61 of the server 12 obtains the used dot count value for each cartridge 15 stored in the memory 53 of the printer 10 at every preset timing (e.g., every one hour) and stores the obtained used dot count value in the memory 63. The controller 61 of the server 12 obtains the type information of each cartridge 15 together with the used dot count value for each cartridge 15, and executes the processes on and after step S18. Then, when the controller 61 of the server 12 determines that the current timing is a preset timing (e.g., the first day of each month) as in step S31 of FIG. 5, the controller 61 executes the processes on and after step S32. In this case, the obtained and calculated values are stored in the memory 63 of the server 12 instead of the memory 53 of the printer 10. Also, in the process of step S36, the sheet count information is obtained from the memory 53 of the printer 10. Further, the process of step S38 is not needed.

In the above-described embodiment, the first of each month is set as the preset timing in step S31, but the preset timing is not limited to the first day of each month. For example, timings such as every seven days or every three months may be set as the preset timing. The controller 51 or the controller 61 compares the current date and time with the preset timing to determine whether the preset timing has come.

In the above-described embodiment, the controller 51 stores, in the EEPROM 57 of the memory 53, information indicating that at least one cartridge 15 for the contract usage mode is mounted in response to at least one cartridge 15 for the contract usage mode is mounted in the mounting case 32 and, in step S32, the controller 51 determines whether there is the information indicating that at least one cartridge 15 for the contract usage mode is mounted in the mounting case 32. However, the controller 51 may store, in the EEPROM 57 of the memory 53, information indicating that both the cartridge 15 for the contract usage mode and the cartridge 15 for the normal usage mode are mounted, or information indicating that only the cartridges 15 for the normal usage mode are mounted, in accordance with the types of the cartridges 15 mounted in the mounting case 32. In this case, the controller 51 may determine whether there is the information indicating that both the cartridge 15 for the contract usage mode and the cartridge 15 for the normal usage mode are mounted, or there is the information indicating that only the cartridges 15 for the normal usage mode are mounted.

In the above-described embodiment, the server 12 adds the number of sheets calculated based on the ratio-based number-of-sheet information to each range of the number of sheets that is set in advance when calculating the charge at the next preset timing to make the deduction based on the number of sheets calculated based on the ratio-based number-of-sheet information. However, the deduction based on the number of sheets calculated based on the ratio-based number-of-sheet information may be made in different way. For example, a discount amount corresponding to the number of sheets calculated based on the ratio-based number-of-sheet information may be calculated, and the calculated discount amount may be deducted from the charge for this or next month.

In the above-described embodiment, the dot count value counted by the controller 51, that is, the number of times the drive element 50 has been driven is used as the consumption amount information. However, an ink consumption amount calculated based on the recording data may be used as the consumption amount information.

In the above-described embodiment, as the ratio information and the ratio-based number-of-sheet information, information based on the ink consumption amount of one or more cartridges 15 for the normal usage mode with respect to the ink consumption amount of all the cartridges 15 is used, but information based on the ink consumption amount of one or more cartridges 15 for the contract usage mode with respect to the ink consumption amount of all the cartridges 15 may be calculated. In this case, since the ratio-based number-of-sheet information indicates the number of sheets corresponding to the ink consumed from one or more cartridges 15 for the contract usage mode, charging based on the ink consumption amount from one or more cartridges 15 for the contract usage mode is realized by calculating the charge based on the ratio-based number-of-sheet information. In other words, there is no need to calculate an amount to be deducted.

In the above-described embodiment, the controller 51 calculates and accumulates the used dot count value for each cartridge 15 every time recording is completed. However, the controller 51 may calculate and accumulate the used dot count value for each cartridge 15 at another preset timing such as every hour. The controller 51 or the controller 61 compares the current date and time with the other preset timing to determine whether the other preset timing has come.

Regardless of whether there is a charge based on the number of sheets with the image recording device, when an accessory cartridge included in the image recording device and a cartridge separately purchased by the user are mounted to the image recording device at the same time, grasping a usage ratio of the accessory cartridge by each user of the image recording device is useful for analyzing the usage frequency of the accessory cartridge, the amount of recording material that needs to be filled in the accessory cartridge, and the like.

The printer 10 in the above-described embodiment is an example of a monitoring device and an image recording device according to aspects of the present disclosure. The mounting case 32 in the above-described embodiment is an example of a cartridge mount according to aspects of the present disclosure. The ink in the above-described embodiment is an example of a recoding material according to aspects of the present disclosure. The sheet count information in the above-described embodiment is an example of number-of-sheet information according to aspects of the present disclosure. The end of the recording and the other preset timing such as every hour in the above-described embodiment and modifications are examples of a first timing according to aspects of the present disclosure. The used dot count value for the cartridge 15 for the contract usage mode in the above-described embodiment is an example of first consumption amount information according to aspects of the present disclosure. The used dot count value for the cartridge 15 for the normal usage mode in the above-described embodiment is an example second consumption amount information according to aspects of the present disclosure. The preset timings such as the first day of each month, every seven days, and every three months in the above-described embodiment and modifications are examples of a second timing according to aspects of the present disclosure.

What is claimed is:

1. A monitoring device configured to monitor image recordation by a recorder configured to perform image recordation on a sheet using a recording material supplied from a first cartridge and a second cartridge mounted to a cartridge mount, the monitoring device comprising:
    a memory; and
    a controller configured to:
        obtain number-of-sheet information indicating a number of sheets on which the image recordation has been performed, first consumption amount information indicating a consumption amount of a recording material consumed from the first cartridge in the image recordation, and second consumption amount information indicating a consumption amount of a recording material consumed from the second cartridge in the image recordation;
        determine ratio information indicating a ratio of the recording material consumed from the second cartridge to a total consumption amount of the recording material consumed from the first cartridge and the recording material consumed from the second cartridge based on the obtained first consumption amount information and second consumption amount information; and store the obtained number-of-sheet information and the determined ratio information in the memory.

2. The monitoring device according to claim 1, wherein the controller is configured to obtain the number-of-sheet information when information indicating that at least one first cartridge is mounted to the cartridge mount is obtained.

3. The monitoring device according to claim 1, wherein the controller is configured to:

obtain the number-of-sheet information, the first consumption amount information, and the second consumption amount information when information indicating that both the first cartridge and the second cartridge are mounted to the cartridge mount is obtained; and not obtain the number-of-sheet information when the information indicating that only the second cartridge is mounted to the cartridge mount is obtained.

4. The monitoring device according to claim 1, wherein the controller is configured to determine a dot count value of the recording material consumed from the first cartridge and a dot count value of the recording material consumed from the second cartridge as the first consumption amount information and the second consumption amount information, respectively, based on obtained recording data.

5. The monitoring device according to claim 1, wherein the controller is configured to determine, based on the number-of-sheet information and the ratio information stored in the memory, ratio-based number-of-sheet information indicating a number of sheets on which the image recordation is performed using the recording material consumed from the second cartridge.

6. The monitoring device according to claim 1, wherein the controller is configured to:

obtain and accumulate the number-of-sheet information, the first consumption amount information, and the second consumption amount information at every preset first timing; and at a preset second timing, determine the ratio information based on the accumulated first consumption amount information and the accumulated second consumption amount information, store the accumulated number-of-sheet information and the determined ratio information in the memory, and resets the accumulated number-of-sheet information, the accumulated first consumption amount information, and the accumulated second consumption amount information.

7. The monitoring device according to claim 6, wherein the controller is configured to:

determine a charge for each preset number of sheets based on the number-of-sheet information stored in the memory;

determine, based on the number-of-sheet information and the ratio information stored in the memory, ratio-based number-of-sheet information indicating a number of sheets on which the image recordation has been performed with the recording material consumed from the second cartridge; and add the determined ratio-based number-of-sheet information to the preset number of sheets to be used at the next second timing.

8. The monitoring device according to claim 6, wherein the controller is configured to:

determine a charge for each preset number of sheets based on the number-of-sheet information stored in the memory;

determine, based on the number-of-sheet information and the ratio information stored in the memory, ratio-based number-of-sheet information indicating a number of sheets on which image recordation has been performed with the recording material consumed from the second cartridge;

determine a discount amount for each preset number of sheets based on the determined ratio-based number-of-sheet information; and subtract the determined discount amount from the charge determined at the next second timing.

9. The monitoring device according to claim 7, wherein each of the first cartridge and the second cartridge includes a cartridge memory storing type information indicating a type of the cartridge regarding charging, wherein the cartridge mount includes an interface for accessing the cartridge memory, and wherein the controller is configured to determine whether the cartridge mounted to the cartridge mount is a charging target based on the type information read from the cartridge memory.

10. The monitoring device according to claim 1, wherein the monitoring device is a server configured to communicate with an image recording device including the cartridge mount and the recorder and including the memory and the controller.

11. The monitoring device according to claim 1 being an image recording device including the cartridge mount, the recorder, the memory, and the controller.

12. An image recordation monitoring method, including:

obtaining number-of-sheet information indicating a number of sheets on which image recordation has been performed by a recorder using a recording material supplied from at least one of a first cartridge and a second cartridge mounted to a cartridge mount, first consumption amount information indicating a consumption amount of the recording material consumed from the first cartridge in the image recordation, and second consumption amount information indicating a consumption amount of the recording material consumed from the second cartridge in the image recordation; and determining, based on the obtained first consumption amount information and the obtained second consumption amount information, ratio information indicating a ratio of the recording material consumed from the second cartridge to a total consumption amount of the recording material consumed from the first cartridge and the recording material consumed from the second cartridge.

13. The image recordation monitoring method according to claim 12, further including determining ratio-based number-of-sheet information indicating a number of sheets on which the image recordation has been performed using the recording material consumed from the second cartridge based on the number-of-sheet information and the determined ratio information.

14. The image recordation monitoring method according to claim 12, further including:
  obtaining and accumulating the number-of-sheet information, the first consumption amount information, and the second consumption amount information at every preset first timing; and
  determining the ratio information based on the accumulated first consumption amount information and the accumulated second consumption amount information at a preset second timing and storing the accumulated number-of-sheet information and the determined ratio information in a memory; and
  resetting the accumulated number-of-sheet information, the accumulated first consumption amount information, and the accumulated second consumption amount information.

15. The image recordation monitoring method according to claim 14, further including:
  determining a charge for each preset number of sheets based on the number-of-sheet information stored in the memory;
  determining, based on the number-of-sheet information and the ratio information stored in the memory, ratio-based number-of-sheet information indicating a number of sheets on which the image recordation has been performed with the recording material consumed from the second cartridge; and
  adding the determined ratio-based number-of-sheet information to each preset number of sheets to be used at the next second timing.

16. The image recordation monitoring method according to claim 14, further including:
  determining a charge for each preset number of sheets based on the number-of-sheet information stored in the memory;
  determining, based on the number-of-sheet information and the ratio information stored in the memory, ratio-based number-of-sheet information indicating a number of sheets on which the image recordation has been performed with the recording material consumed from the second cartridge;
  determining a discount amount for each preset number of sheets based on the determined ratio-based number-of-sheet information; and
  subtracting the determined discount amount from the charge determined at the next second timing.

17. A printer comprising:
  a cartridge mount for mounting a first cartridge and a second cartridge;
  a recorder configured to record an image on a sheet using a first recording material supplied from the first cartridge and a second recording material supplied from the second cartridge;
  a memory; and
  a controller configured to:
    obtain number-of-sheet information indicating a number of sheets on which an image is recorded in a particular term;
    obtain first consumption amount information indicating a first consumption amount of the first recording material consumed from the first cartridge in the particular term;
    obtain second consumption amount information indicating a second consumption amount of the second recording material consumed from the second cartridge in the particular term;
    determine ratio information indicating a ratio of the second consumption amount to a total consumption amount of the first consumption amount and the second consumption amount; and
    determine ratio-based number-of-sheet information based on the number-of-sheet information and the ratio information, the ratio-based number-of-sheet information indicating a number of sheets on which an image is recorded using the second recording material in the particular term.

18. The printer according to claim 17,
  wherein the controller is configured to transmit the number-of-sheet information and the ratio-based number-of-sheet information to a server,
  the server being configured to determine a charge based on the number-of-sheet information and determine a discount amount based on the ratio-based number-of-sheet information.

* * * * *